United States Patent
Kunimatsu et al.

(10) Patent No.: US 7,590,147 B2
(45) Date of Patent: Sep. 15, 2009

(54) LAN SIGNAL TRANSMITTING METHOD AND APPARATUS ADAPTED TO SHUT DOWN A LAN SIGNAL IF EXTRACTED LINK INFORMATION INDICATES LINK DOWN

(75) Inventors: Kazuhiro Kunimatsu, Kawasaki (JP); Takeshi Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 564 days.

(21) Appl. No.: 11/251,916

(22) Filed: Oct. 18, 2005

(65) Prior Publication Data
US 2006/0274785 A1 Dec. 7, 2006

(30) Foreign Application Priority Data
Jun. 1, 2005 (JP) .............................. 2005-161165

(51) Int. Cl.
*H04J 3/16* (2006.01)
(52) U.S. Cl. ...................................... 370/466
(58) Field of Classification Search ................. 370/465, 370/466, 467, 474, 230, 241, 254, 389, 392, 370/464
See application file for complete search history.

(56) References Cited

U.S. PATENT DOCUMENTS

| | | | |
|---|---|---|---|
| 2002/0154358 A1 | 10/2002 | Hino | |
| 2003/0112833 A1* | 6/2003 | Kamiya | 370/535 |
| 2003/0123493 A1* | 7/2003 | Takahashi | 370/539 |
| 2004/0156313 A1* | 8/2004 | Hofmeister et al. | 370/229 |
| 2004/0174910 A1* | 9/2004 | Okamoto et al. | 370/535 |
| 2006/0098686 A1* | 5/2006 | Takakuwa et al. | 370/470 |

FOREIGN PATENT DOCUMENTS

| | | |
|---|---|---|
| JP | 2001-045069 | 2/2001 |
| JP | 2001-111526 | 4/2001 |
| JP | 2002-217940 | 2/2002 |
| JP | 2002-319909 | 10/2002 |
| JP | 2004-357164 | 12/2004 |

* cited by examiner

*Primary Examiner*—Kwang B Yao
*Assistant Examiner*—Anh Ngoc Nguyen
(74) *Attorney, Agent, or Firm*—Fujitsu Patent Center

(57) ABSTRACT

A LAN signal transmission method and a transmission apparatus using the method are disclosed. A first transmission apparatus extracts only a data section of a LAN signal that is received, and accommodates the data section in a digital wrapper signal. Link information between a first LAN apparatus is accommodated in the overhead of the digital wrapper signal, and the digital wrapper signal is transmitted to a second transmission apparatus. The second transmission apparatus extracts the data section of the digital wrapper signal and the link information from the overhead of the digital wrapper signal that is received. The LAN signal that contains the data section and the link information is constituted, and transmitted to a second LAN apparatus. If the extracted link information indicates "link down", the LAN signal to the second LAN apparatus is shut down, and the link information concerning the second LAN apparatus indicating "link down" is masked, the link information being transmitted to the first LAN apparatus.

7 Claims, 11 Drawing Sheets

LAN SIGNAL TRANSMITTING METHOD AND APPARATUS ADAPTED TO SHUT DOWN A LAN SIGNAL IF EXTRACTED LINK INFORMATION INDICATES LINK DOWN

BACKGROUND OF THE INVENTION

1. Field of the Invention

The present invention generally relates to a LAN signal transmitting method and a transmitting apparatus using the method, and especially relates to a LAN signal transmitting method and a transmitting apparatus using the method wherein the transmission apparatuses are provided between LAN apparatuses so that a LAN signal is transmitted and received.

2. Description of the Related Art

Methods of transmitting LAN (Local Area Network) signals, such as Gigabit Ethernet (registered trademark) signals, a long distance at high speed are proposed. In the present specification, LAN includes MAN (Metropolitan Area Network) and WAN (Wide Area Network).

The conventional methods include a method of mapping an IP (Internet Protocol) signal to an SDH (Synchronous Digital Hierarchy) frame after accommodating the IP signal in ATM (Asynchronous Transfer Mode), and a method of accommodating the IP signal in the SDH frame after the IP signal has been once terminated in a higher layer such as the layer 3 of the OSI basic reference model. According to the conventional methods, an intermediary framing process in the case of ATM, and the termination in the higher layer are required. For this reason, overhead (useless processing) becomes a significant burden, and a problem is in that a processing circuit becomes complicated and processing delay becomes significant.

For example, Patent Reference 1 discloses a method of directly mapping LAN signals, such as Gigabit Ethernet (registered trademark) signals, onto an OTN (Optical Transport Network) frame. Here, OTN refers to the transmission frame form of the digital wrapper method recommended by ITU-T G.709.

However, the problem with the method disclosed by Patent Reference 1 is that the transmission efficiency is degraded due to, e.g., vacant bytes that have to be inserted. Patent Reference 2 attempts to solve this problem by raising accommodation efficiency by carrying out 8B/10B decoding of the LAN signals, whereby only a data section of the LAN signals is extracted and mapped onto the OTN frame.

However, the method proposed by Patent Reference 2 has a problem in transmitting the control code that is a part of the LAN signal other than the data section. The control code of the LAN signal is for exchanging status information between adjacent transmission apparatuses. Since the control code is terminated when the 8B/10B decoding is carried out, the control code after decoding has to be accommodated in the OTN frame so that LAN connection between the transmission apparatuses is maintained.

FIG. 1 shows the configuration of common LAN apparatuses 10 and 11 that transmit and receive the LAN signal. Here, although the LAN apparatuses 10 and 11 contain functional blocks L1 through L7 depending on the number of layers that are terminated, a LAN apparatus generally contains up to the layer 2 (MAC layer).

The layer 1 (physical layer) of each of the LAN apparatuses 10 and 11 is called PHY, and performs optical/electrical conversion of the LAN signal, 8B/10B encoding and decoding, management of a link state, etc. Management of the link state is performed by exchanging a control code (C. C.) and a data set for control called configuration register between the PHYs.

The format and information of the control code are shown in FIG. 2, where FD (Full Duplex) and HD (Half Duplex) specify whether full duplex or half-duplex, respectively, is to be performed. The type of the link state, a flow control, etc., are exchanged by PS (Pause), RF (Remote Fault), and ACK (Acknowledge).

The exchange of the control code is called "negotiation", and if the negotiation is established, the state of the link is called "link up". Then, the information exchanged here can be provided to a higher layer, and information from the higher layer can be set up.

Where transmission apparatuses 12 and 13 are arranged between the LAN apparatuses 10 and 11 as shown in FIG. 3, the control code has to be exchanged between the LAN apparatuses 10 and 11 through the transmission apparatuses 12 and 13 so that the LAN apparatuses 10 and 11 are linked through the transmission apparatuses 12 and 13.

As shown in FIG. 4, the LAN signal from the LAN apparatus 10 is decoded by an 8B/10B decoding unit of the transmission apparatus 12, where the data and the control code are extracted, the control code is provided to the overhead of SDH by an OHB mapping unit 14, and is provided to the transmission apparatus 13. Then, the transmission apparatus 13 extracts the control code from the overhead of SDH, combines the control code and the data, and encodes the data and the control code by an 8B/10B encoding unit. In this way, the LAN apparatuses 10 and 11 are linked through the transmission apparatuses 12 and 13. This is the conventional method proposed by, e.g., Patent Reference 3.

In addition, Patent Reference 4 discloses transfer processing of an information packet in a WDM (Wavelength Division Multiplexing) communication system. Further, Patent Reference 5 discloses a technique using an alarm mask in an opposite direction in a WDM communication system.

[Patent Reference 1] JPA 2002-217940
[Patent Reference 2] JPA 2001-45069
[Patent Reference 3] JPA 2004-357164
[Patent Reference 4] JPA 2001-111526
[Patent Reference 5] JPA 2002-319909

PROBLEM(S) TO BE SOLVED BY THE INVENTION

However, according to the method shown by FIG. 4, since the control code is transmitted using the overhead of the SDH frame, the transmission apparatus 13 has to perform a special process of combining the data and the control code by a CC/DATA combining unit 15 (the data and the control code being demapped by an SDH/OTN frame demapping unit), and encoding by an 8B/10B encoding unit 16. For this reason, when a general MAC framer (8B/10B encoding circuit) is used, software is required, and there is a problem of causing processing delay. Further, there is also a possibility that delay arises in transmission of the control code, and linking may not be normally performed as transmission distance becomes long.

SUMMARY OF THE INVENTION

It is a general object of the present invention to provide a LAN signal transmitting method and a transmitting apparatus using the method that substantially obviate one or more of the problems caused by the limitations and disadvantages of the related art.

A specific object of the present invention is to provide a LAN signal transmitting method and a transmitting apparatus using the method that solve the above-described problems, improve frame accommodation efficiency, and do not require the special process of control code transmission and the processing at the higher layer that causes process delay.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a LAN signal transmitting method and a transmitting apparatus using by the method particularly pointed out in the specification in such full, clear, concise, and exact terms as to enable a person having ordinary skill in the art to practice the invention.

To achieve these and other advantages and in accordance with the purpose of the invention, as embodied and broadly described herein, one preferred mode of the invention provides the LAN signal transmitting method and the LAN signal transmitting apparatus as follows.

MEANS FOR SOLVING THE PROBLEM

The LAN signal transmission method of one preferred mode of the present invention, whereby a first LAN apparatus and a second LAN apparatus transmit and receive a LAN signal through a first transmission apparatus and a second transmission apparatus; the first transmission apparatus converts the LAN signal from the first LAN apparatus into a digital wrapper signal; the digital wrapper signal is transmitted to the second transmission apparatus that converts the received digital wrapper signal into the LAN signal; and the converted LAN signal is provided to the second LAN apparatus, includes:

a step of the first transmission apparatus extracting only a data section of the LAN signal that is received, accommodating the data section in the digital wrapper signal, accommodating link information between the first LAN apparatus and the first transmission apparatus in overhead of the digital wrapper signal, and transmitting the digital wrapper signal to the second transmission apparatus;

a step of the second transmission apparatus extracting the data section from the digital wrapper signal, extracting the link information from the overhead of the digital wrapper signal that is received, combining the data section and the link information to constitute the LAN signal, and providing the LAN signal to the second LAN apparatus;

a step of shutting down the LAN signal to the second LAN apparatus if the extracted link information indicates "link down"; and a step of masking link information between the second LAN apparatus and the second transmission apparatus such that the link information indicating "link down" is masked, the link information being transmitted to the first LAN apparatus.

In this way, since only the data section of the LAN signal is accommodated in the digital wrapper signal, accommodation efficiency can be improved, the special process of control code transmission is not required, and the processing delay by the higher layer is avoided.

Further, according to the LAN signal transmission method of the present invention, the second transmission apparatus detects a failure between the first transmission apparatus and the second transmission apparatus, and if the failure is detected, shuts down the LAN signal to the second LAN apparatus, and cancels masking of the link information between the second LAN apparatus and the second transmission apparatus indicating "link down", the link information being transmitted to the first LAN apparatus. In this way, information about the "link down" state between the first and second transmission apparatuses is provided to the first and second LAN apparatuses.

The transmission apparatus of the present invention uses the LAN signal transmission method of the present invention, whereby the first LAN apparatus and the second LAN apparatus transmit and receive the LAN signal through the first transmission apparatus and the second transmission apparatus; the first transmission apparatus converts the LAN signal from the first LAN apparatus into a digital wrapper signal; the digital wrapper signal is transmitted to the second transmission apparatus that converts the received digital wrapper signal into the LAN signal; and the converted LAN signal is provided to the second LAN apparatus, and includes:

an extracting unit for extracting only a data section of the LAN signal that is received;

a link state detecting unit for detecting a link state between the first LAN apparatus and the first transmission apparatus;

a mapping unit for accommodating the extracted data section of the LAN signal in a digital wrapper signal, for accommodating the detected link state in overhead of the digital wrapper signal, and for transmitting the digital wrapper signal to the second transmission apparatus;

a demapping unit for extracting the link information from the overhead of the digital wrapper signal that is received while extracting the data section of the LAN signal from the digital wrapper signal that is received;

a LAN signal generating unit for generating a LAN signal containing the extracted data section and the link information, and for transmitting the LAN signal to the second LAN apparatus;

a shutdown unit for shutting down the LAN signal to the second LAN apparatus when the extracted link information indicates "link down";

a masking unit for masking link information indicating "link down" between the second LAN apparatus and the second transmission apparatus, the link information being transmitted to the first LAN apparatus when the extracted link information indicates "link down".

In this way, since only the data section of the LAN signal is accommodated in the digital wrapper signal and transmitted, accommodation efficiency can be improved, the special processing of control code transmission is not required, and the processing delay by the higher layer is avoided.

Further, the transmission apparatus of the present invention includes:

a failure detecting unit for detecting a failure between the first transmission apparatus and the second transmission apparatus, and causing the shutdown unit to shut down the LAN signal to the second LAN apparatus if the failure is detected; and a mask releasing unit for canceling masking of the link information between the second LAN apparatus and the second transmission apparatus if the link information indicates "link down", the link information being transmitted to the first LAN apparatus.

In this way, the "link down" state between the first and second transmission apparatuses can be provided to the first and second LAN apparatuses.

EFFECT OF THE INVENTION

According to the present invention, since only the data section of the LAN signal is accommodated in the digital wrapper signal and transmitted, accommodation efficiency can be improved, the special processing for control code transmission is not required, and the processing delay by the higher layer is avoided.

DESCRIPTION OF THE PREFERRED EMBODIMENTS

In the following, embodiments of the present invention are described with reference to the accompanying drawings.

First, the principle of the present invention is described.

Figure 1:
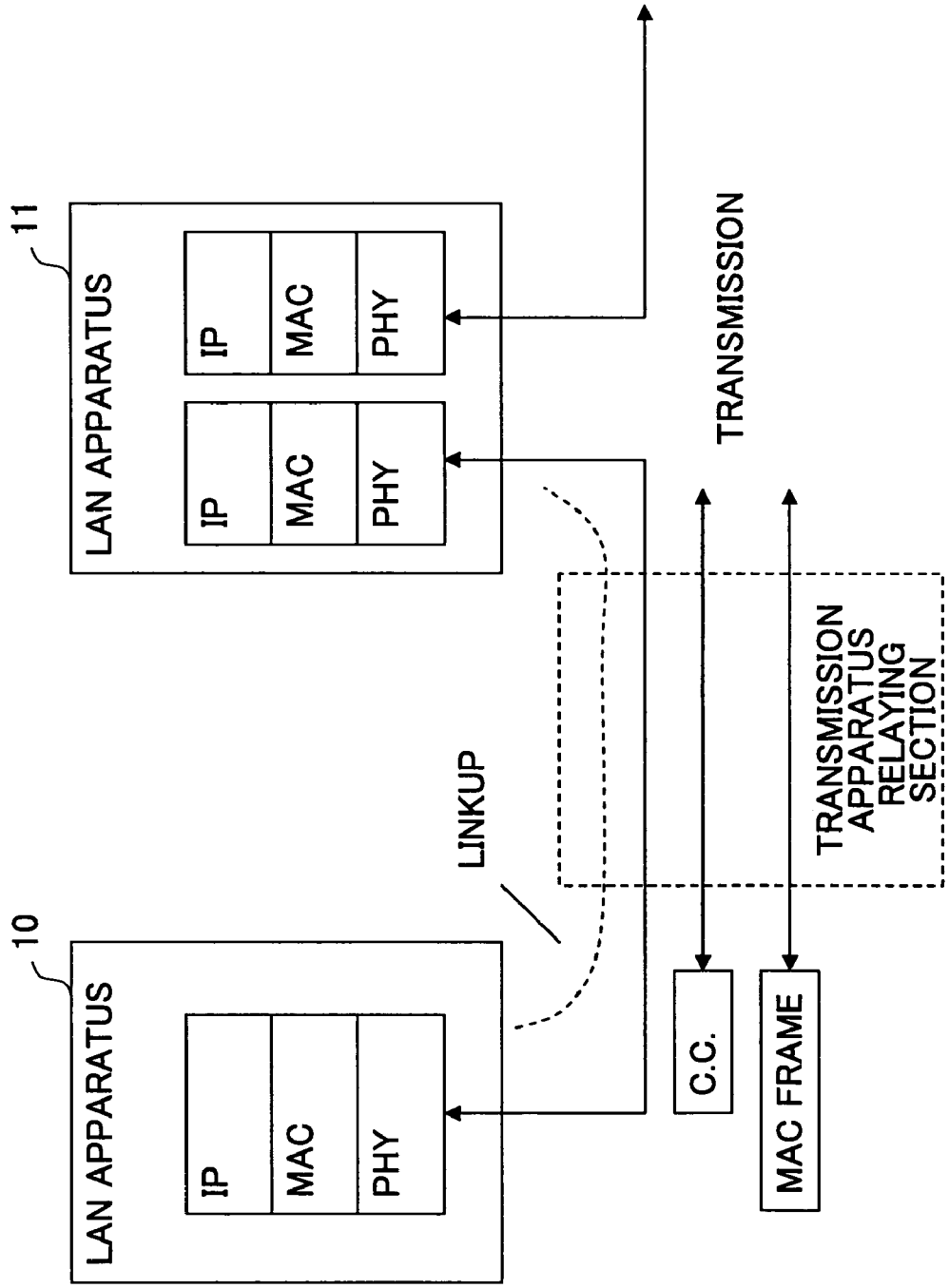
FIG. 1 is a block diagram showing the configuration of a common LAN apparatus that transmits a LAN signal.
Figure 2:
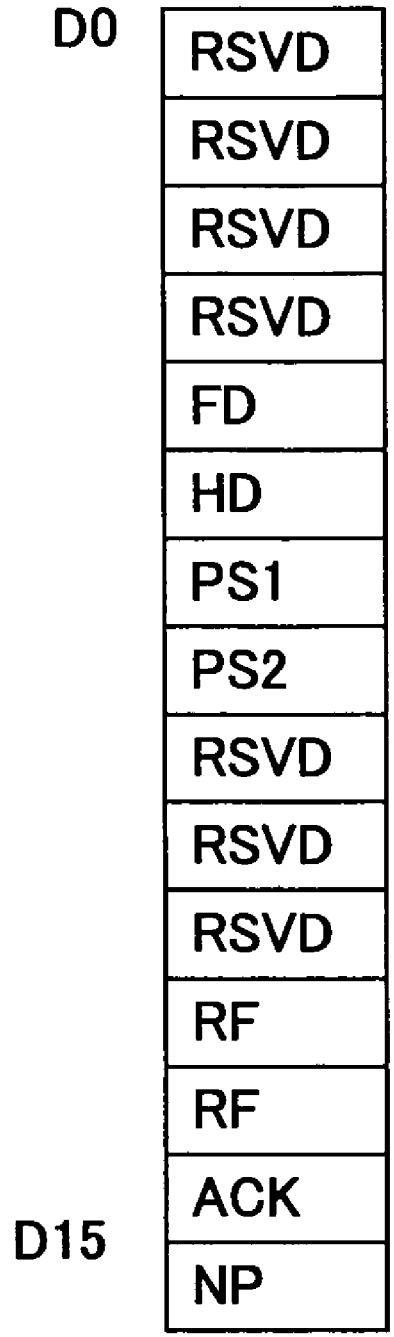
FIG. 2 is a data chart showing the format and information of a control code.
Figure 3:
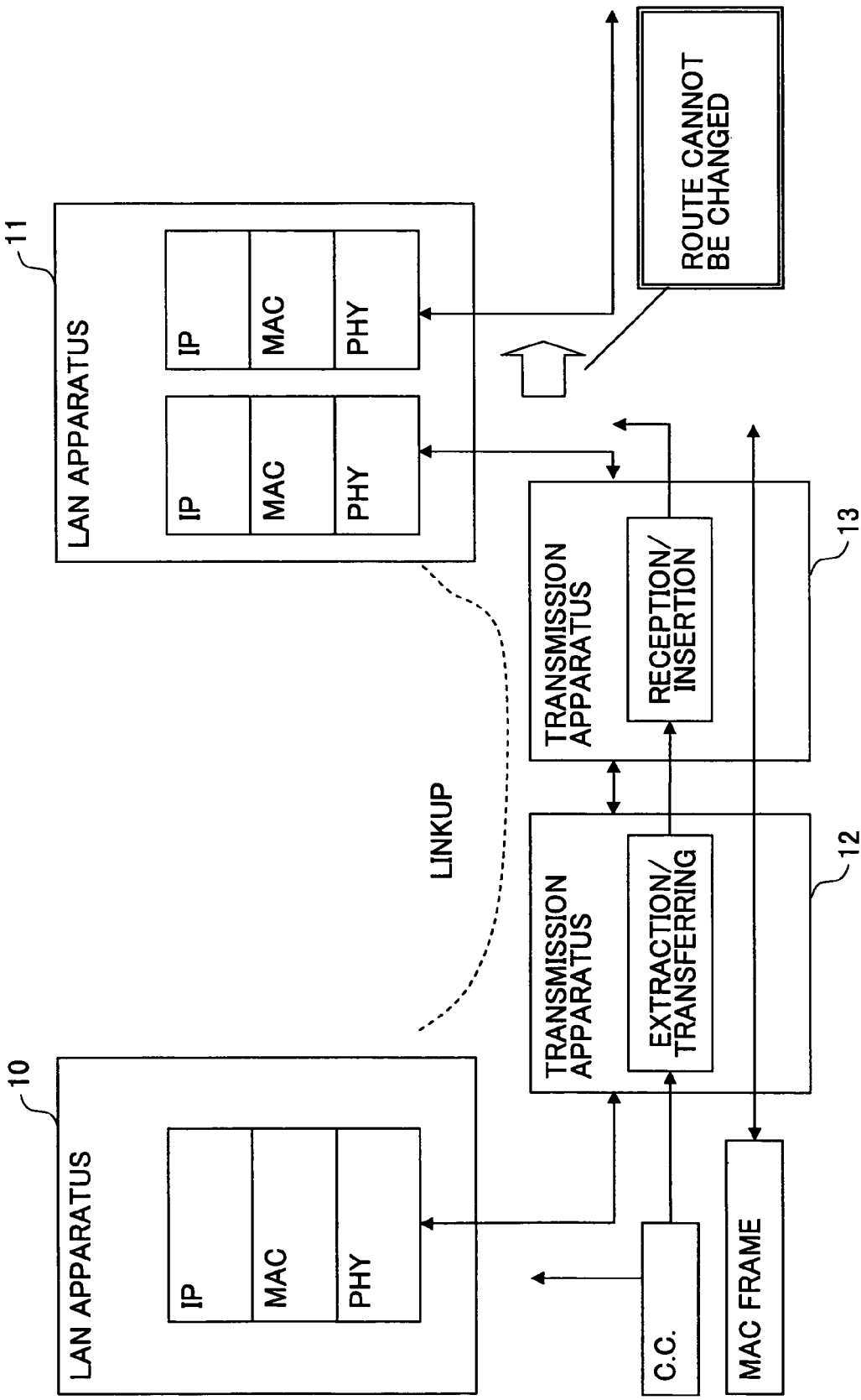
FIG. 3 is a block diagram explaining a conventional LAN signal transmission method.
Figure 4:
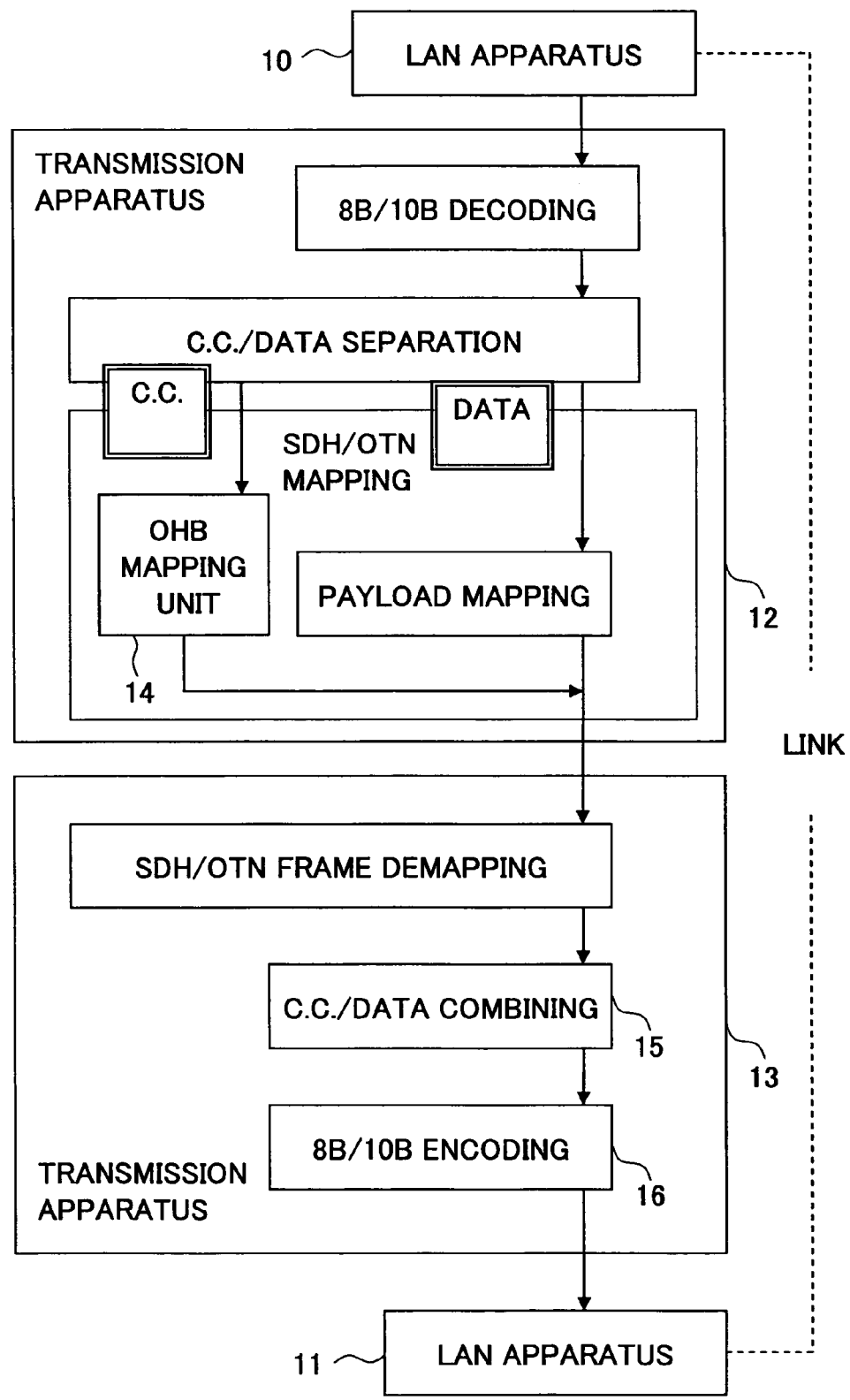
FIG. 4 is a block diagram explaining the conventional LAN signal transmission method.
Figure 5:
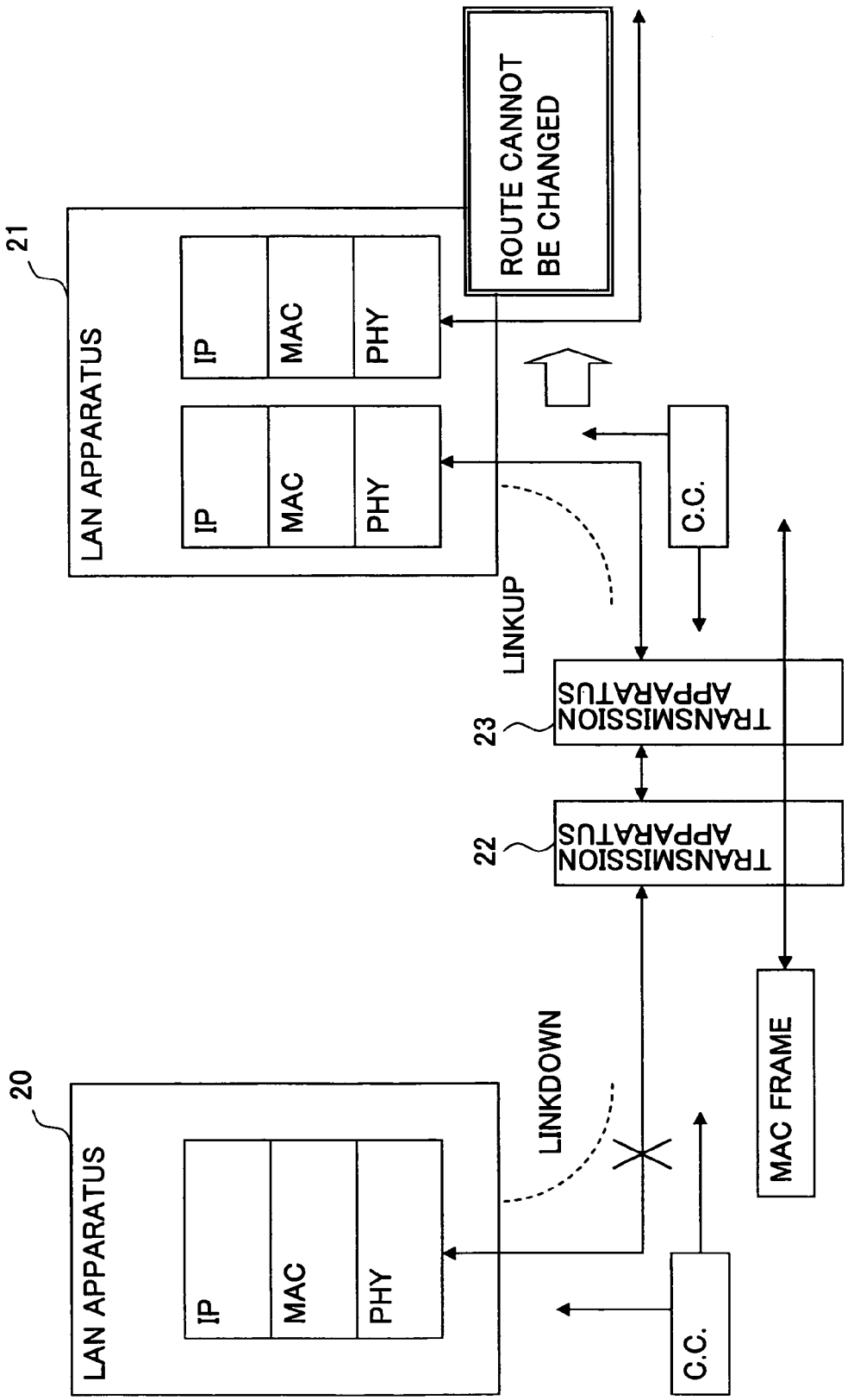
FIG. 5 is a block diagram explaining the principle of the present invention.

As shown in FIG. 5, transmission apparatuses 22 and 23 are arranged such that transmission is carried out between LAN apparatuses 20 and 21, wherein a link is established between the LAN apparatus 20 and the transmission apparatus 22; and a link is established between the LAN apparatus 21 and the transmission apparatus 23.

When the link between the LAN apparatus 20 and the transmission apparatus 22 is lost, while the link between the LAN apparatus 21 and the transmission apparatus 23 is established, the LAN apparatus 21 cannot change the route to the LAN apparatus 20 to another route. In order to change the route, either control at a higher layer or a manual operation is required. This is the problem when a control code is not transmitted between the transmission apparatuses, i.e., when the link is divided into two parts.

That is, when establishing an independent link between a LAN apparatus and a transmission apparatus, minimum information that should be exchanged between the transmission apparatuses 22 and 23 in order to avoid disconnection of the LAN connection between the LAN apparatuses 20 and 21 is information about the link state, i.e., "link up" or "link down", as applicable, between the LAN apparatuses 20 and 21 in each independent link, i.e., between the LAN apparatus 20 and its associated transmission apparatus 22, and between the LAN apparatus 21 and its associated transmission apparatus 23.

Accordingly, in the present invention, the transmission apparatus and the LAN apparatus are configured such that 8B/10B decoding and encoding are performed and the control code is terminated, the data section is mapped onto the payload of the OTN frame and transmitted, and as for the link down state, an alarm transfer is used between the transmission apparatuses. As the alarm transfer, for example, an AIS signal of PM that is defined in the OTN overhead is used.

When the transmission apparatus 23 detects "link down" by the alarm transfer, the LAN apparatus 21 is forced to be disconnected, i.e., "link down".

In this case, since attempts are made to notify the countering station of the link down state, there is a possibility of deadlock occurring due to forced link down in both directions.

Specifically, with reference to FIG. 5, if the link between the transmission apparatus 22 and the LAN apparatus 20 is disconnected, e.g., by cable disconnection, the link state between the LAN apparatus 20 and the transmission apparatus 22 is "link down". Then, the transmission apparatus 22 provides information about the link down state to the transmission apparatus 23 using the alarm transfer. Then, the transmission apparatus 23 disconnects the link with the LAN apparatus 21, i.e., "link down". At this time, the transmission apparatus 23 transmits this link down state to the transmission apparatus 22. For this reason, even when the link between the transmission apparatus 22 and the LAN apparatus 20 is restored (i.e., "link up"), the transmission apparatus 22 keeps performing as though the link between the transmission apparatus 23 and the LAN apparatus 21 is down. In this way, the link between the LAN apparatuses 20 and 21 cannot be restored, i.e., the link is deadlocked.

In order to avoid the deadlock state, when the alarm transfer signal providing notification that the link down state is received, insertion of the alarm transfer signal in the opposite direction is masked (prevented) such that the link down state is announced only in the original direction.

Further, in the case where the transmission apparatuses 22 and 23 are disconnected and normal transmission and reception cannot be carried out between the LAN apparatuses 20 and 21, notification of the link down is not provided in either direction because the link states between the LAN apparatuses 20 and 21 and the transmission apparatuses 22 and 23, respectively, are "link up". In order to cope with this situation, when the link between the transmission apparatuses 22 and 23 is lost, an optical output is shut down so that information indicating the link down state can be provided to the LAN apparatuses 20 and 21 from the transmission apparatuses 22 and 23, respectively, using the alarm transfer signal. Alternatively, an abnormality signal is provided to the LAN apparatuses 20 and 21, the abnormality signal being a signal that is not normally received as a LAN signal, such as a signal of a fixed pattern.

Figure 6:
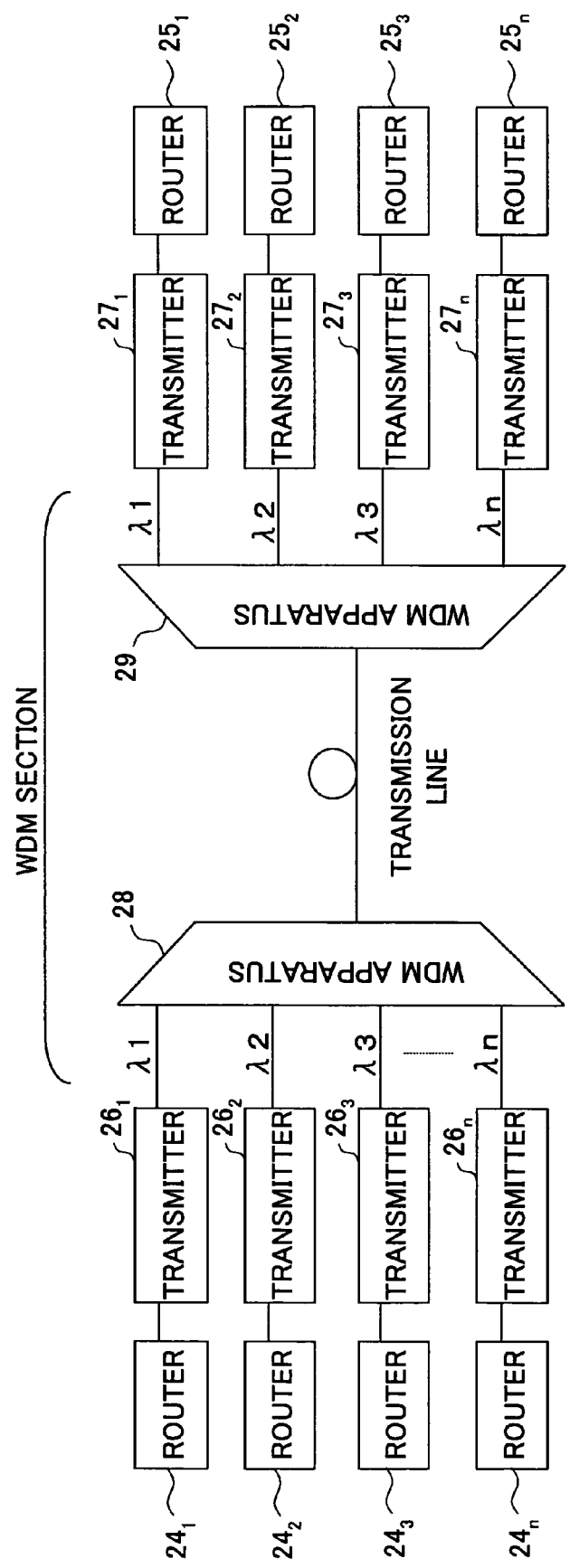
FIG. 6 is a block diagram showing a system configuration of a WDM system according to an embodiment, to which WDM system the LAN signal transmission method of the present invention is applied.

FIG. 6 shows a system configuration of an embodiment of a WDM system to which the LAN signal transmission method of the present invention is applied. A LAN apparatus (on the left of FIG. 6) includes routers $24_1$ through $24_n$, transmitters $26_1$ through $26_n$, and a WDM apparatus 28. Another router (on the right of FIG. 6) includes routers $25_1$ through $25_n$, transmitters $27_1$ through $27_n$, and a WDM apparatus 29. The LAN apparatuses transmit and receive LAN signals. The transmitters $26_1$ through $26_n$ and $27_1$ through $27_n$ map LAN signals received from the routers $24_1$ through $24_n$ and $25_1$ through $25_n$, respectively, to, e.g., the OTN frame, and provide the corresponding mapped signals to the corresponding WDM apparatuses 28 and 29 as optical signals of predetermined wavelengths. The WDM apparatuses 28 and 29 carry out wavelength multiplexing of the optical signals provided by the transmitters $26_1$ through $26n$ and $27_1$ through $27_n$, respectively, and transmit to the countering WDM apparatuses 29 and 28, respectively, through a transmission line. Further, the WDM apparatuses 28 and 29 demultiplex the corresponding WDM signals received from the countering WDM apparatuses 29 and 28 by wavelengths, and provide the demultiplexed signals to the corresponding transmitters $26_1$ through $26_n$ and $27_1$ through $27_n$, which convert the corresponding demultiplexed signals to the LAN signals. The LAN signals are provided to the respective routers $24_1$ through $24_n$ and $25_1$ through $25_n$.

The First Embodiment

Figure 7:
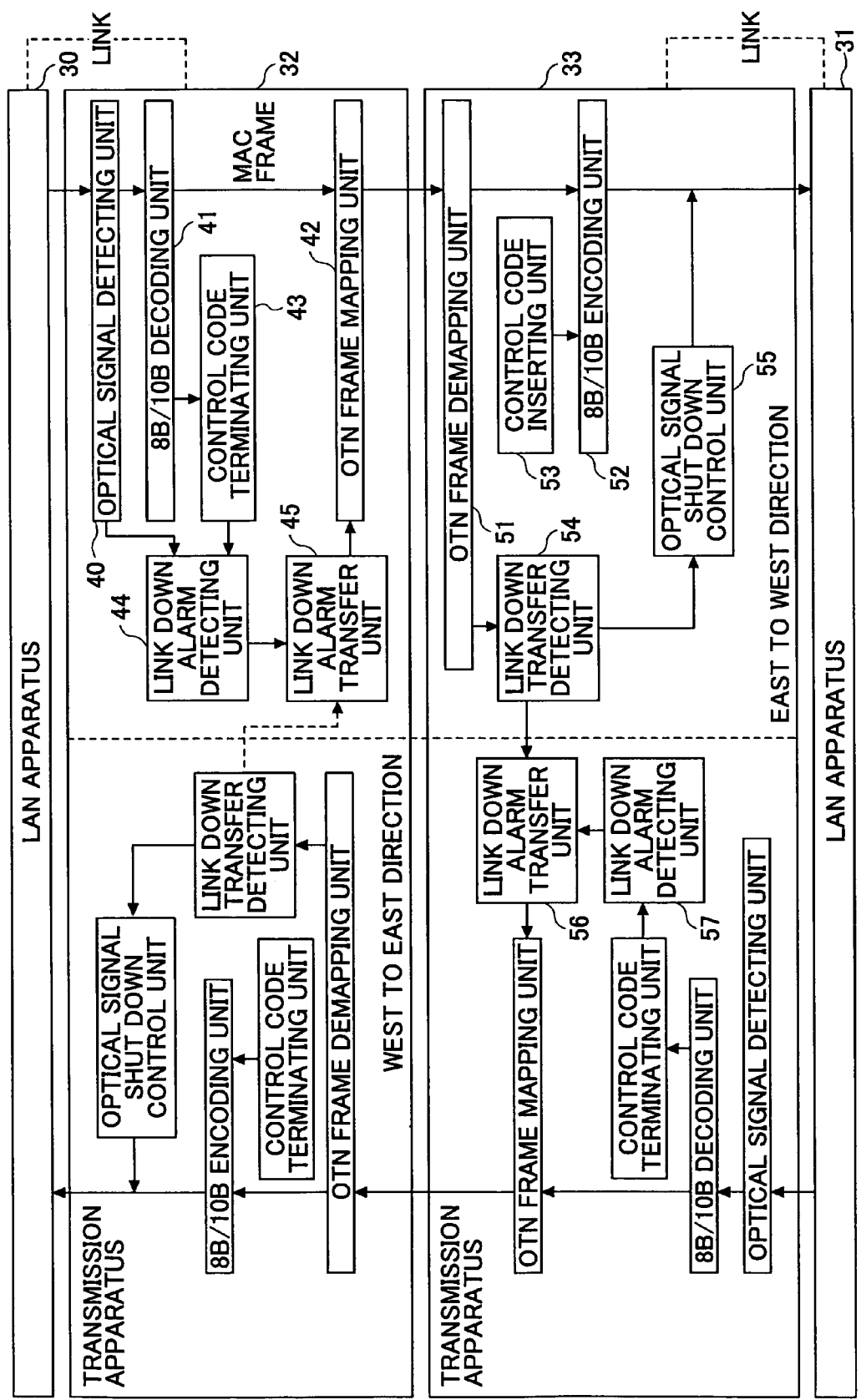
FIG. 7 is a block diagram of the LAN signal transmission method of the present invention according to a first embodiment.

FIG. 7 is a block diagram of the LAN signal transmission method according to the first embodiment of the present invention. LAN apparatuses 30 and 31 are routers that transmit and receive the LAN signal of, for example, 1.25 Gbps. Transmission apparatuses 32 and 33 transmit and receive an SDH signal between the transmission apparatuses 32 and 33; and transmit and receive LAN signals between the LAN apparatuses 30 and 31, respectively.

The transmission apparatus 32 receives the LAN signal from the LAN apparatus 30, and provides the LAN signal to an optical signal detection unit 40 that detects whether the optical signal is present, and then provides the LAN signal to an 8B/10B decoding unit 41. Further, the detected signal output by the optical signal detecting unit 40 is provided to a link down alarm detecting unit 44.

The 8B/10B decoding unit 41 carries out 8B/10B conversion of the LAN signal, and divides the converted signal into a control code (C. C.) and a MAC frame (data division) at a rate of of 1 Gbps. The MAC frame is accommodated in the payload of the OTN frame by an OTN frame mapping unit 42, and is transmitted to the transmission apparatus 33 through the transmission line.

The control code separated by the 8B/10B decoding unit 41 is terminated by a control code terminating unit 43, and provided to the link down alarm detecting unit 44. The link down alarm detecting unit 44 detects a link down alarm from the control code. When the link down alarm detecting unit 44 either detects a link down alarm or the output of the optical signal detecting unit 40 indicating that the optical signal is not present, a link down alarm (alarm transfer signal) is generated, and provided to the OTN frame mapping unit 42 through a link down alarm transfer unit 45. The OTN frame mapping unit 42 accommodates the link down alarm to the OTN overhead, and transmits the link down alarm in the transmission apparatus 33 through the transmission line. Here, the presence or absence of the optical signal is detected by the optical signal detecting unit 40, while the link down alarm is detected from the control code by the link down alarm detecting unit 44. This is because the layers to detect differ, that is, a link down state can occur even when the optical signal is present.

Figure 8:
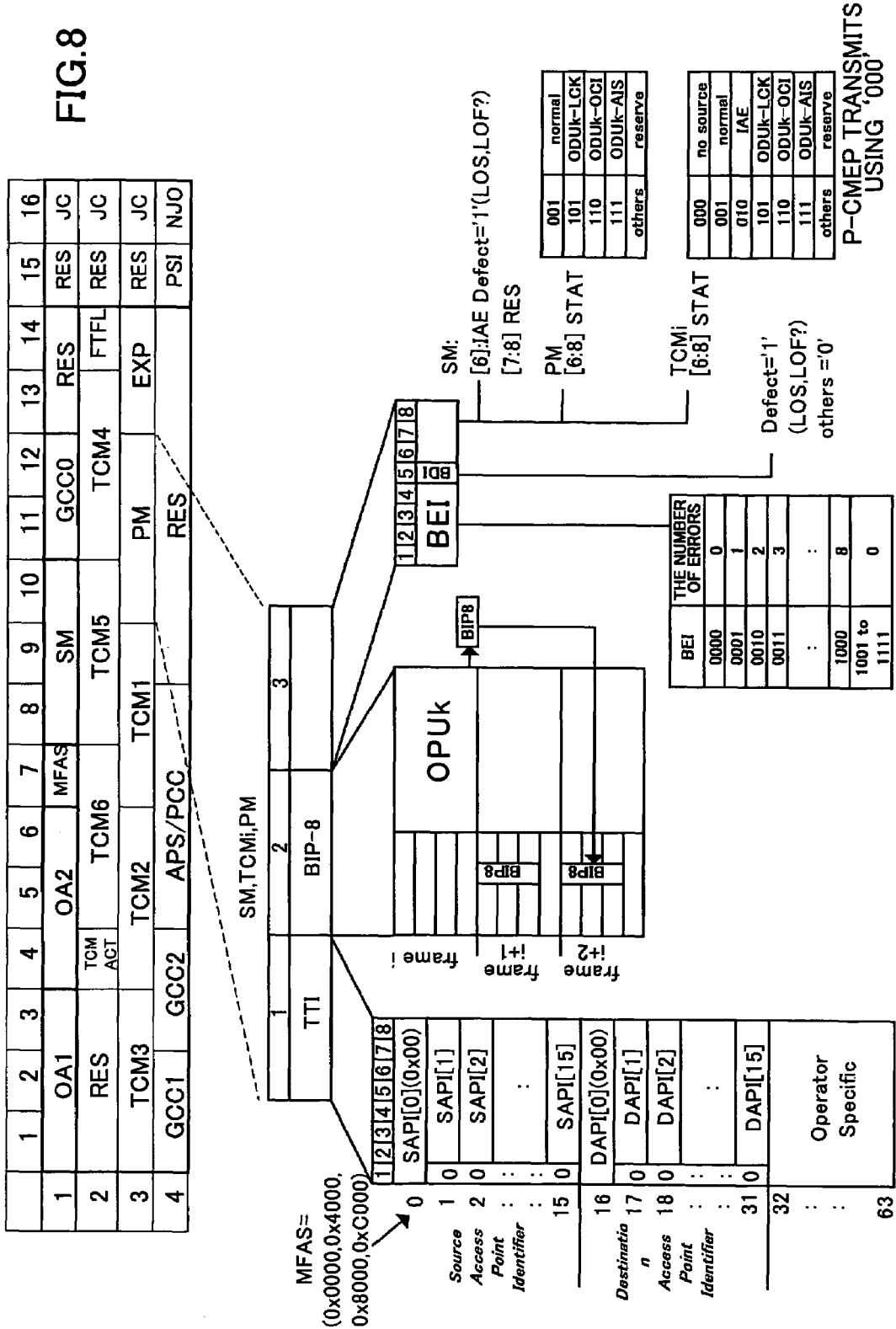
FIG. 8 is a format plan showing the format of an OTN frame overhead.

FIG. 8 shows the format of the OTN overhead. The AIS signal (value "111") is defined in PM (path monitor) of the OTN overhead as shown in FIG. 8. The link down alarm, for example, is transmitted using the AIS signal.

The SDH signal transmitted by the transmission apparatus 32 and received by the transmission apparatus 33 is provided to an OTN frame demapping unit 51. The OTN frame demapping unit 51 extracts the link down alarm from the OTN overhead, and provides the link down alarm to a link down transfer detecting unit 54, while extracting the MAC frame that is mapped into the OTN frame and providing the MAC frame to an 8B/10B encoding unit 52.

Further, a control code insertion unit 53 provides a control code to the 8B/10B encoding unit 52. The 8B/10B encoding unit 52 combines the MAC frame and the control code, performs 8B/10B encoding, and transmits the obtained LAN signal of 1.25 Gbps to the LAN apparatus 31.

Further, when a link down alarm is received by the link down transfer detecting unit 54 of the transmission apparatus 33, the receipt of the link down alarm is communicated to an optical shutdown control unit 55, and the optical shutdown control unit 55 shuts down the optical signal output from the 8B/10B encoding unit 52, and forces disconnecting the LAN apparatus 31.

When the link down alarm is received by the link down transfer detecting unit 54, a mask signal is generated and provided to a link down alarm transfer unit 56 that transmits the mask signal to the LAN apparatus 30. When the mask signal is provided to the link down alarm transfer unit 56, a link down alarm detected by a link down alarm detecting unit 57 of the transmission apparatus 33 is masked such that the link down alarm is not transmitted to the LAN apparatus 30. In this way, the deadlock state of the transmission apparatuses 32 and 33 is avoided.

Here, although the above description describes only one direction from the transmission apparatus 32 to the transmission apparatus 33, the same applies to the reverse direction from the transmission apparatus 33 to the transmission apparatus 32, and explanation thereof is omitted.

Figure 9:
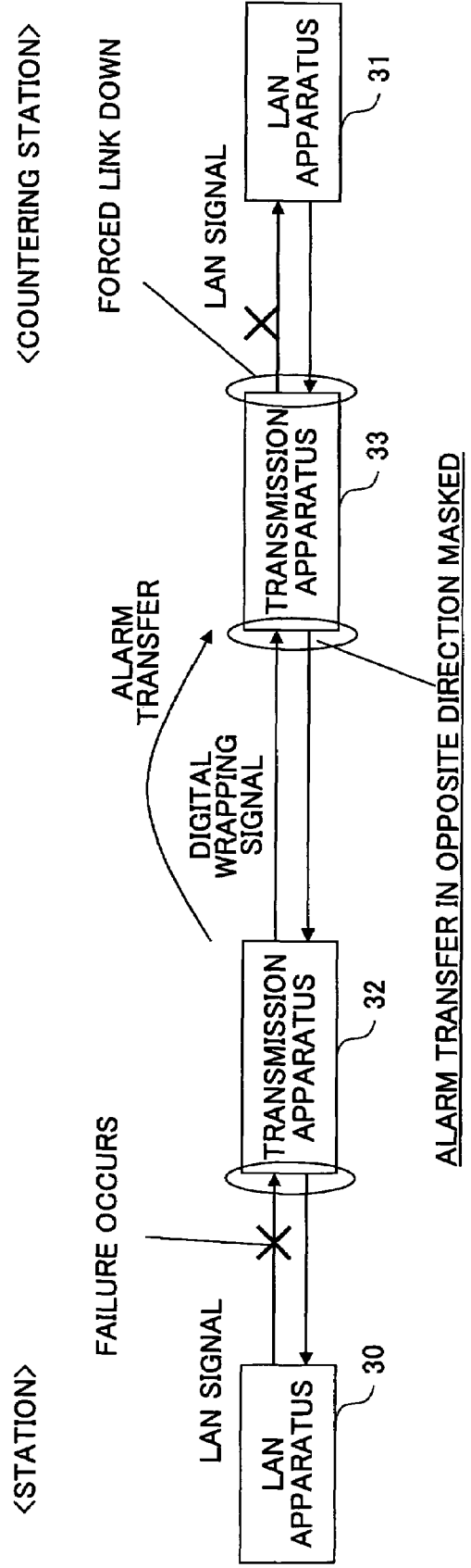
FIG. 9 is a block diagram showing an alarm transfer operation of the WDM system to which the first embodiment of the present invention is applied.

FIG. 9 shows the operation of alarm transfer in the WDM system to which the first embodiment of the present invention is applied. When a link failure (link down) occurs between the LAN apparatus 30 and the transmission apparatus 32, communications between the LAN apparatuses 30 and 31 are not possible, and link down should be compulsorily carried out so that the LAN apparatus 31 recognizes that the link is not available.

In the case where the link is down due to reception of the LAN signal, the transmission apparatus 32 inserts an alarm transfer signal into the digital wrapper signal of the WDM section, and transmits the digital wrapper signal to the countering transmission apparatus 33. The transmission apparatus 33 that receives the alarm transfer signal compulsorily shuts out the optical output, and disconnects the link with the LAN apparatus 31, i.e., a compulsory link down state.

With this compulsory link down, the communications between the transmission apparatus 32 and the LAN apparatus 30 becomes impossible; for this reason, insertion of an alarm transfer signal into the digital wrapper signal in the opposite direction is attempted; however, since the insertion of the alarm transfer signal into the digital wrapper signal in the opposite direction is masked by the alarm transfer signal inserted to the digital wrapper signal in the forward direction, i.e., from the transmission apparatus 32 to the transmission apparatus 33; in this manner, the compulsory link down is carried out only in the forward direction.

In this way, the compulsory link down state is announced only in one direction; accordingly, when the failure is repaired, the LAN apparatuses 30 and 31 can restore the communications without the deadlock state occurring. Further, the network structured in this way can offer an efficient network wherein the LAN signal is not divided, transmitting only the MAC frame of the LAN signal.

The Second Embodiment

Figure 10:
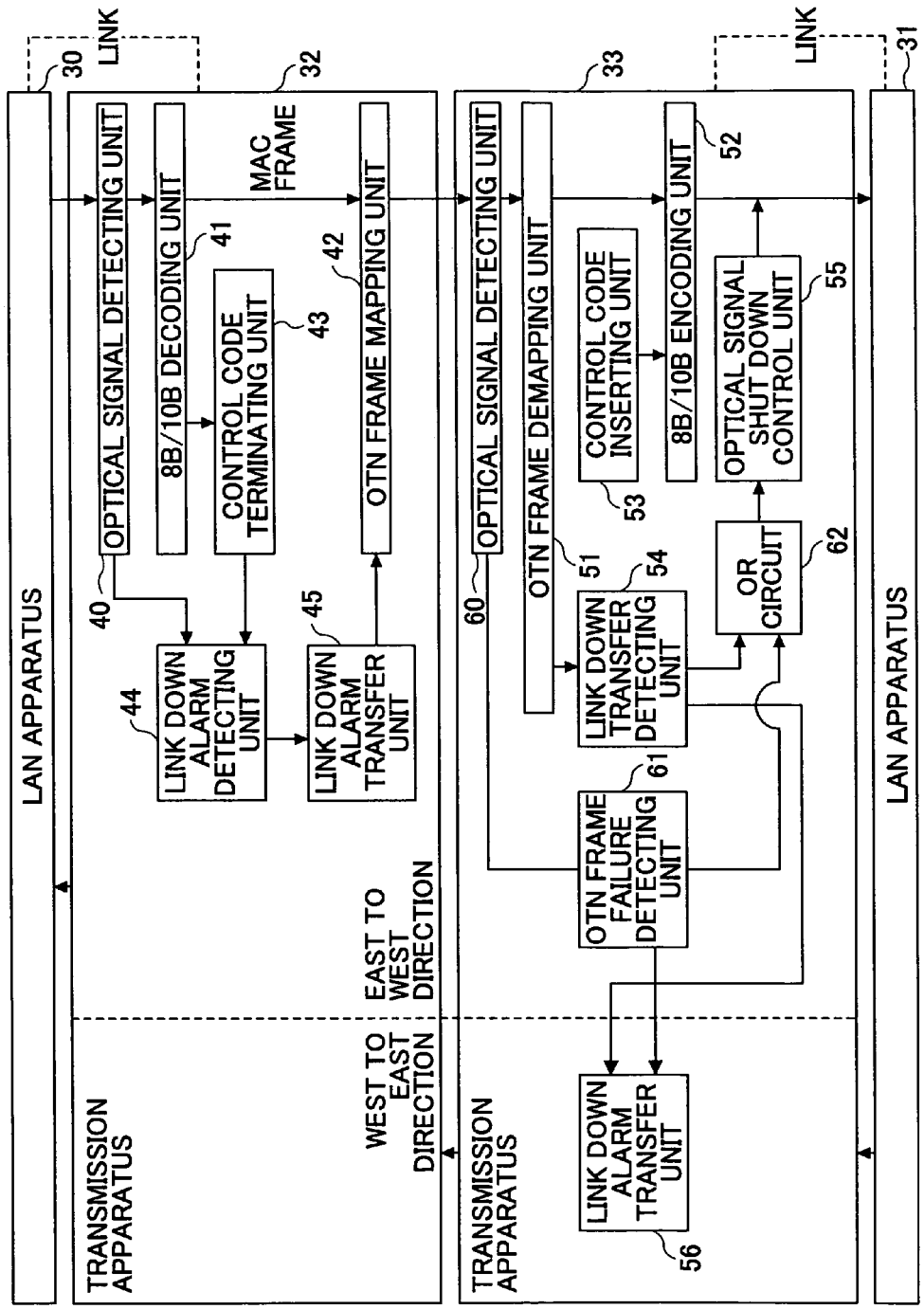
FIG. 10 is a block diagram of the LAN signal transmission method according to a second embodiment of the present invention.

FIG. 10 is a block diagram of the LAN signal transmission method according to the second embodiment of the present invention. In FIG. 10, the same reference numbers are given to the same portions as FIG. 7. The LAN apparatuses 30 and 31 are routers that transmit and receive the LAN signal of, for example, 1.25 Gbps. The transmission apparatuses 32 and 33 transmit and receive the LAN signal between the LAN apparatuses 30 and 31, and transmit and receive the SDH signal between transmission apparatuses 32 and 33.

The LAN signal received by the transmission apparatus 32 from the LAN apparatus 30 is provided to the optical signal detection unit 40 for detecting the presence or absence of the optical signal, and is provided to the 8B/10B decoding unit 41. Further, a result of detection by the optical signal detecting unit 40 is provided to the link down alarm detecting unit 44.

The 8B/10B decoding unit 41 carries out 8B/10B conversion of the LAN signal, and separates the LAN signal into the control code (C. C.) and the MAC frame of 1 Gbps. The OTN frame mapping unit 42 accommodates the MAC frame in the payload of the OTN frame, and transmits the OTN frame to the transmission apparatus 33 through the transmission line.

The control code separated by the 8B/10B decoding unit 41 is terminated by the control code terminating unit 43, and is provided to the link down alarm detecting unit 44. The link down alarm detecting unit 44 detects a link down alarm from the control code. When the link down alarm is detected, or when the detection result by the optical signal detecting unit 40 indicates that the optical signal is not present, the link down alarm detecting unit 44 generates a link down alarm (alarm transfer signal), and provides the link down alarm to the OTN frame mapping unit 42 through the link down alarm transfer unit 45. The link down alarm is, then, accommodated in the OTN overhead, and is transmitted to the transmission apparatus 33 through the transmission line. Here, the link down alarm is transmitted using the AIS signal of PM (path monitor) of the OTN overhead as shown in FIG. 8.

The SDH signal sent from the transmission apparatus 32 and received by the transmission apparatus 33 is provided to an optical signal detecting unit 60 for detecting the presence or absence of the optical signal, and then, provided to the OTN frame demapping unit 51. Further, a result of detection of the optical signal detecting unit 60 is provided to an OTN frame failure detecting unit 61. The OTN frame demapping unit 51 extracts a link down alarm from the OTN overhead, and provides the link down alarm to the link down transfer detecting unit 54; extracts the MAC frame that is mapped to the OTN frame and transmitted; and provides the MAC frame to the 8B/10B encoding unit 52.

Further, the control code inserting unit 53 provides a control code to the 8B/10B encoding unit 52. The 8B/10B encoding unit 52 combines the MAC frame and the control code, performs 8B/10B encoding, and transmits the encoded signal, i.e., the LAN signal of 1.25 Gbps to the LAN apparatus 31.

When the link down transfer detecting unit 54 of the transmission apparatus 33 receives the link down alarm, that fact is provided to the optical shutdown control unit 55 through an OR circuit 62. If the optical signal detecting unit 60 determines that the optical signal is not present, the OTN frame failure detecting unit 61 generates an OTN frame failure alarm and provides the OTN frame failure alarm to the optical shutdown control unit 55 through the OR circuit 62.

If one of the link down alarm and the OTN frame failure alarm is provided through the OR circuit 62, the optical shutdown control unit 55 shuts down the optical signal output from the 8B/10B encoding unit 52 and compulsorily disconnects the LAN apparatus 31.

Furthermore, when a link down alarm is received, the link down transfer detecting unit 54 generates a mask signal, and provides the mask signal to the link down alarm transfer unit 56 for transmitting the mask signal to the LAN apparatus 30. In the case where the OTN frame failure detecting unit 61 generates the OTN frame failure alarm, a mask release signal is generated and provided to the link down alarm transfer unit 56.

When the mask signal is provided, the link down alarm transfer unit 56 masks the link down alarm detected by the link down alarm detecting unit 57 of the transmission apparatus 33; however, if the mask release signal is provided, even if the mask signal is provided, masking of the link down alarm detected at the link down alarm detecting unit 57 is released (canceled), and the link down alarm is transmitted to the LAN apparatus 30.

In this way, when a failure occurs in the WDM section between the transmission apparatuses 32 and 33, and when the LAN apparatuses 30 and 31 connected to the transmission apparatuses 32 and 33, respectively, cannot detect a link down, the link down state can be communicated not only in the forward direction from the transmission apparatus 32 to the transmission apparatus 33, but also in the opposite direction.

In addition, although the embodiment is described with reference to the forward direction from the transmission apparatus 32 to the transmission apparatus 33, the same applies to the opposite direction from the transmission apparatus 33 to the transmission apparatus 32, the description thereof being omitted.

Figure 11:
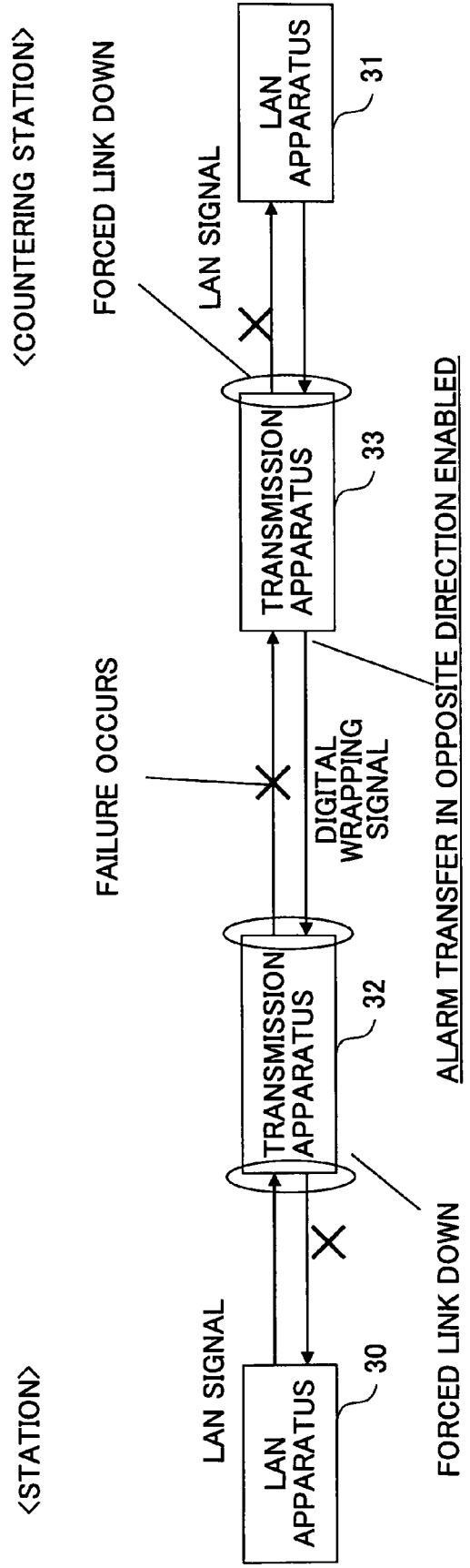
FIG. 11 is a block diagram showing the alarm transfer operation of the WDM system to which the second embodiment is applied.

The alarm transfer operation of the WDM system to which the second embodiment is applied is shown in FIG. 11. When a failure occurs in the WDM section between the transmission apparatuses 32 and 33, the optical signal in the failure generating direction (i.e., the direction from the transmission apparatus 33 to the LAN apparatus 31) is shut down, and a link down between the transmission apparatus 33 and the LAN apparatus 31 occurs. At the same time, since the link down alarm transfer in the opposite direction (direction from the transmission apparatus 33 to the LAN apparatus 32) is not masked, the optical signal in the opposite direction, i.e., from the transmission apparatus 32 to the LAN apparatus 30, is also shut down, and a link down occurs between the LAN apparatuses 30 and 31. Accordingly, if the failure of the WDM section is repaired, the alarm transfer in the opposite direction is masked such that the deadlock situation is prevented from occurring.

Here, the embodiment is described as using 8B/10B encoding and decoding; nevertheless, the present invention is not limited to this, but another encoding and decoding system such as 64B/660B encoding and decoding may be used.

Further, although the SDH signal is illustrated as the signal between the transmission apparatuses, the present invention is not limited to this, but another signal such as a SONET (synchronous optical network) signal can be used.

In addition, the 8B/10B decoding unit 41 serves as an extracting unit given in the claims, and the optical signal detecting unit 40 serves as a link state detecting unit. The OTN frame mapping unit 42 serves as a mapping unit, and the OTN frame demapping unit 51 serves as a demapping unit. The 8B/10B encoding unit 52 serves as a LAN signal generating unit, and the link down transfer detecting unit 54 and the optical shutdown control unit 55 serve as a shutdown unit. The link down transfer detecting unit 54 serves as a masking unit, and the optical signal detecting unit 60 and the OTN frame failure detecting unit 61 serve as a failure detecting unit and a mask releasing unit.

Further, the present invention is not limited to these embodiments, but variations and modifications may be made without departing from the scope of the present invention.

The present application is based on Japanese Priority Application No. 2005-161165 filed on Jun. 1, 2005 with the Japanese Patent Office, the entire contents of which are hereby incorporated by reference.

What is claimed is:

1. A LAN signal transmission method of transmitting and receiving a LAN signal between a first LAN apparatus and a second LAN apparatus each for transmitting and receiving the LAN signal through a first transmission apparatus and a second transmission apparatus that are arranged between the first LAN apparatus and the second LAN apparatus, wherein the first transmission apparatus converts the LAN signal transmitted from the first LAN apparatus into a digital wrapper signal, and transmits the digital wrapper signal to the second transmission apparatus; and wherein the second transmission apparatus converts the digital wrapper signal into the LAN signal, and transmits the LAN signal to the second LAN apparatus, the LAN signal transmission method comprising:

a step of the first transmission apparatus extracting only a data section of the LAN signal that is received, accommodating the data section in the digital wrapper signal, accommodating link information between the first transmission apparatus and the first LAN apparatus in an overhead of the digital wrapper signal, and transmitting the digital wrapper signal to the second transmission apparatus;

a step of the second transmission apparatus extracting the data section of the digital wrapper signal of the LAN signal, extracting the link information from the overhead of the digital wrapper signal, generating a LAN signal constituted by the extracted data section and the link information, and transmitting the LAN signal to the second LAN apparatus; and a step of shutting down the LAN signal to the second LAN apparatus if the extracted link information indicates "link down", and masking link information to be transmitted to the first LAN apparatus, the link information indicating "link down" between the second transmission apparatus and the second LAN apparatus.

2. The LAN signal transmission method as claimed in claim 1, wherein the second transmission apparatus determines whether a failure is present between the first transmission apparatus and the second LAN apparatus, and if the second transmission apparatus determines that there is the failure, the second transmission apparatus shuts down the LAN signal to the second LAN apparatus, and cancels masking of the link information between the second transmission apparatus and the second LAN apparatus indicating "link down", the link information being transmitted to the first LAN apparatus.

3. A transmission apparatus for transmitting and receiving a LAN signal between a first LAN apparatus and a second LAN apparatus each of the first LAN apparatus and second LAN apparatus are for transmitting and receiving the LAN signal through a first transmission apparatus and a second transmission apparatus that are arranged between the first LAN apparatus and the second LAN apparatus, wherein the first transmission apparatus converts the LAN signal transmitted from the first LAN apparatus into a digital wrapper signal, and transmits the digital wrapper signal to the second transmission apparatus, and wherein the second transmission apparatus converts the digital wrapper signal into the LAN signal, and transmits the LAN signal to the second LAN apparatus, the transmission apparatus comprising:

an extracting unit to extract only a data section of the LAN signal that is received;

a link state detecting unit to detect a link state between the first LAN apparatus and the first transmission apparatus;

a mapping unit to accommodate the extracted data section of the LAN signal in a digital wrapper signal, accommodate the detected link state in an overhead of the digital wrapper signal, and transmit the digital wrapper signal to the second transmission apparatus;

a demapping unit to extract the link information from the overhead of the digital wrapper signal that is received while extracting the data section of the LAN signal from the digital wrapper signal that is received;

a LAN signal generating unit to configure a LAN signal containing the extracted data section and the link information, and transmit the LAN signal to the second LAN apparatus;

a shutdown unit to shut down the LAN signal to the second LAN apparatus when the extracted link information indicates "link down";

a masking unit to mask link information indicating "link down" between the second transmission apparatus and the second LAN apparatus, the link information being transmitted to the first LAN apparatus when the extracted link information indicates "link down".

4. The transmission apparatus as claimed in claim 3, further comprising:

a failure detecting unit to detect a failure between the first transmission apparatus and the second transmission apparatus, and cause the shutdown unit to shut down the LAN signal to the second LAN apparatus if the failure is detected; and a mask releasing unit to cancel masking of the link information concerning between the second LAN apparatus and the second transmission apparatus if the link information indicates "link down", the link information being transmitted to the first LAN apparatus.

5. The transmission apparatus as claimed in claim 3, further comprising:

a control code insertion unit to generate a control code that is to be inserted to the LAN signal to be transmitted to the second LAN apparatus, and provide the control code to the LAN signal generating unit.

6. The transmission apparatus as claimed in claim 3, wherein the digital wrapper signal is an OTN frame.

7. The transmission apparatus as claimed in claim 3, wherein the extracting unit extracts the data section of the LAN signal received by performing 8B/10B decoding, and the LAN signal generating unit configures the LAN signal that contains the data section extracted by performing 8B/10B encoding.

* * * * *